(12) United States Patent
Roberts et al.

(10) Patent No.: US 8,080,906 B2
(45) Date of Patent: Dec. 20, 2011

(54) GENERATOR FOR CONVERTING MECHANICAL VIBRATIONAL ENERGY INTO ELECTRICAL ENERGY

(75) Inventors: Stephen Roberts, Winchester (GB); Roy Freeland, Shawford (GB)

(73) Assignee: Perpetuum Ltd., Southhampton (GB)

( * ) Notice: Subject to any disclaimer, the term of this patent is extended or adjusted under 35 U.S.C. 154(b) by 294 days.

(21) Appl. No.: 11/911,055

(22) PCT Filed: Apr. 11, 2006

(86) PCT No.: PCT/GB2006/001300
§ 371 (c)(1),
(2), (4) Date: Apr. 16, 2008

(87) PCT Pub. No.: WO2006/109033
PCT Pub. Date: Oct. 19, 2006

(65) Prior Publication Data
US 2008/0278008 A1  Nov. 13, 2008

(30) Foreign Application Priority Data
Apr. 12, 2005  (GB) .................................. 0507394.5

(51) Int. Cl.
*H02K 35/06* (2006.01)
*H02K 35/00* (2006.01)
*H02K 35/04* (2006.01)

(52) U.S. Cl. ................. 310/29; 310/15; 310/20; 310/21; 310/25; 310/28

(58) Field of Classification Search .................... 310/15, 310/17, 19, 20, 21, 25, 26, 27, 28, 29, 30, 310/36, 37, 38, 39, 49.02, 49.09, 216.021–216.044; H02K 35/02, 35/00, 35/04, 35/06
See application file for complete search history.

(56) References Cited

U.S. PATENT DOCUMENTS
2,998,553 A * 8/1961 Moon et al. ................... 335/261
(Continued)

FOREIGN PATENT DOCUMENTS
DE        183725 C   10/1905
(Continued)

OTHER PUBLICATIONS

"Magnet." Collins English Dictionary—Complete & Unabridged 10th Edition. HarperCollins Publishers. Oct. 6, 2010. <Dictionary.com http://dictionary.reference.com/browse/magnet>.*

*Primary Examiner* — Quyen Leung
*Assistant Examiner* — Michael Andrews
(74) *Attorney, Agent, or Firm* — Colin P. Cahoon; Celina M. Orr; Carstens & Cahoon, LLP

(57) ABSTRACT

An electromechanical generator for converting mechanical vibrational energy into electrical energy, the electromechanical generator comprising a substantially annular high-permeability core, the core including at least one magnet therein to define a magnetic circuit, at least one rotatable bearing mounting the core to at least one bearing support, the at least one bearing permitting the core to pivot about a pivot axis, a gap provided in the core, a body of high-permeability material located in the gap, the body being spaced from respective end faces of the core by a respective spacing whereby pivoting movement of the core about the pivot axis causes relative movement between the end faces of the core and the body, and a rotationally fixed coil surrounding a length of the core coaxially with the pivot axis.

11 Claims, 1 Drawing Sheet

U.S. PATENT DOCUMENTS

| | | | | |
|---|---|---|---|---|
| 3,614,677 A | * | 10/1971 | Wilfinger | 310/25 |
| 3,766,006 A | * | 10/1973 | Frisch et al. | 310/14 |
| 4,381,672 A | * | 5/1983 | O'Connor et al. | 310/25 |
| 5,180,939 A | * | 1/1993 | Rosswurm | 310/27 |
| 5,263,218 A | * | 11/1993 | Giuliani et al. | 310/29 |
| 5,804,933 A | * | 9/1998 | Åhs | 310/36 |
| 2004/0207281 A1 | * | 10/2004 | Detela | 310/162 |

FOREIGN PATENT DOCUMENTS

| | | |
|---|---|---|
| DE | 1613713 A1 | 4/1970 |
| DE | 3535143 C1 | 4/1987 |
| EP | 0977345 A | 2/2000 |
| FR | 336445 A | 11/1903 |
| WO | 9949556 A | 9/1999 |

* cited by examiner

GENERATOR FOR CONVERTING MECHANICAL VIBRATIONAL ENERGY INTO ELECTRICAL ENERGY

FIELD OF THE INVENTION

The present invention relates to an electromechanical generator for converting mechanical vibrational energy into electrical energy. In particular, the present invention relates to such a device which is a miniature generator capable of converting ambient vibration energy into electrical energy for use, for example, in powering intelligent sensor systems. Such a system can be used in inaccessible areas where wires cannot be practically attached to provide power or transmit sensor data.

BACKGROUND OF THE INVENTION

There is currently an increasing level of research activity in the area of alternative power sources for micro electrical mechanical systems (MEMS) devices, such devices being described in the art as being used for 'energy harvesting' and as 'parasitic power sources'. Such power sources are currently being investigated for powering wireless sensors.

It is known to use an electromechanical generator for harvesting useful electrical power from ambient vibrations. A typical magnet-coil generator consists of a spring-mass combination attached to a magnet or coil in such a manner that when the system vibrates, a coil cuts through the flux formed by a magnetic core. The mass which is moved when vibrated is mounted on a cantilever beam. The beam can either be connected to the magnetic core, with the coil fixed relative to an enclosure for the device, or vice versa. The electromechanical generators are miniaturized. This makes them readily locatable in a variety of positions on or in a host apparatus for providing electrical power for driving single or plural components.

One such known miniature electromechanical generator is illustrated in FIG. 1. The known design for the electromechanical generator 2 has magnets 4, 6 attached to a flexible spring-steel beam 8 adjacent to a fixed copper coil 10 located between the magnets 4, 6. An opening 12 is formed in the beam 8 at a free end 14 thereof and the magnets 4, 6 are located on opposite sides of the opening 12. The coil 10 is disposed in the opening 12, and is mounted on an aim 16 extending upwardly from a base 18. The other end 20 of the beam 8 is fixed to an upright support 22 extending upwardly from the base 18. Each magnet 4, 6 comprises a pair of magnet elements 24, 26, each element 24, 26 being located on a respective upper or lower side of the beam 8, with the two elements 24, 26 of each pair being connected together by a keeper 28 located at a side remote from the coil 10. This creates a region of magnetic flux between the magnets 4, 6 in which the coil 10 is disposed.

When the electromechanical generator 2 is subjected to vibration in the vertical direction (see FIG. 1) and at a frequency near the resonance frequency of the assembly of the beam 8 and the magnets 4, 6, the beam 8 and magnets 4, 6 carried thereon oscillate relative to the coil 10. This movement results in a changing magnetic flux through the coil 10, and hence an induced voltage along the wire of the coil 10.

This known design is magnetically very efficient because of the lack of any significant conductive elements in the flux path, which would otherwise tend to support eddy currents. However, the low permeability (and hence high reluctance) path between the magnets 4, 6 leads to a low flow of flux and hence a low induced voltage per turn of the coil 10. To attempt to counteract the low induced voltage, the coil 10 is required to have many turns in a small volume so that the output voltage is at a sufficient value for a useful power output. This in turn results in a high coil resistance, which reduces the electrical efficiency of the electromechanical generator 2.

Also, the known electromechanical generator 2 requires a sprung beam 8, which acts as a cantilever beam, supporting the vibratable magnet assembly. Such a beam requires a suitable spring material to be provided and for the beam supporting the vibratable magnet assembly to be carefully tuned. This can be difficult to achieve accurately, and the resonance characteristics of the sprung beam can vary over the design lifetime of the electromechanical generator 2.

DE29618015U discloses an electrical generator for bicycles in which a magnet is mounted on a leaf spring that reacts to vibration and moves relative to a core to induce a voltage in a coil. This rudimentary disclosure does not relate to miniature generators as discussed hereinabove, or address or solve the problems discussed above with respect to the known electromechanical generator that requires a sprung beam which acts as a cantilever beam.

SU1075357A discloses a body oscillatory motion electric generator for charging a battery. A hinged body having an E-shaped magnetic circuit with a winding on the middle core and a permanent magnet on an outer core is supported for oscillatory motion by a helical spring. This disclosure does not address or solve the problems discussed above with respect to the known electromechanical generator that requires a sprung beam which acts as a cantilever beam.

SU776487A discloses an electrical generator for charging a cardio-simulator battery. The generator incorporates a rotatable cylindrical armature with a coil and conical magnet poles at its ends. This disclosure does not address or solve the problems discussed above with respect to the known electromechanical generator that requires a sprung beam which acts as a cantilever beam.

U.S. Pat. No. 5,180,939 discloses a mechanically commutated linear alternator incorporating a pair of reciprocating elements. This disclosure does not address or solve the problems discussed above with respect to the known electromechanical generator that requires a sprung beam which acts as a cantilever beam.

Accordingly, there is still a need to enhance the efficiency of the conversion by an electromechanical generator, in particular a miniature electromechanical generator, of mechanical vibration energy into electrical energy, and thereby into useful electrical power.

There is also a need for an electromechanical generator, in particular a miniature electromechanical generator, which overcomes or obviates the problems of sprung cantilever beams described above.

SUMMARY OF THE INVENTION

The present invention aims to provide to an improved electromechanical generator for converting mechanical vibrational energy into electrical energy which can operate more efficiently than known devices and/or does not encounter problems of using a cantilever sprung beam as a resonant element.

The present invention accordingly provides an electromechanical generator for converting mechanical vibrational energy into electrical energy, the electromechanical generator comprising a substantially annular high-permeability core, the core including at least one magnet therein to define a magnetic circuit, at least one rotatable bearing mounting the core to at least one bearing support, the at least one bearing permitting the core to pivot about a pivot axis, a gap provided in the core, a body of high permeability material located in the gap, the body being spaced from respective end faces of the core by a respective spacing whereby pivoting movement of the core about the pivot axis causes relative movement between the end faces of the core and the body, and a coil surrounding a length of the core.

Preferably, the core is mounted to the support by two of the rotatable bearings which are mutually spaced along the pivot axis.

Preferably, the coil is coaxial with the pivot axis.

Preferably, the coil is rotationally fixed, so that it does not rotate as the core pivots.

Preferably, two magnets are provided in the core, one on each side of the coil.

Preferably, a body of low-permeability material is attached to the core at a position remote from the pivot axis.

Preferably, the body of high permeability material is mounted on a support that is adapted selectively to be movable towards and away from the pivot axis.

Preferably, the annular core is substantially rectangular in shape, having a pivoted end on which the coil is mounted, an opposite free end including the gap, and two opposed sides extending therebetween, each side including a respective magnet.

Preferably, the electromechanical generator further comprises a base on which the at least one bearing support and the body of high-permeability material are carried.

The present invention also provides a method of converting mechanical vibrational energy into electrical energy using an electromechanical generator, the method comprising the steps of: providing an electromechanical generator comprising a substantially annular high-permeability core, the core including at least one magnet therein to define a magnetic circuit, at least one rotatable bearing mounting the core to at least one bearing support, the at least one bearing permitting the core to pivot about a pivot axis, a gap provided in the core, a body of high-permeability material located in the gap, the body being spaced from respective end faces of the core by a respective spacing whereby pivoting movement of the core about the pivot axis causes relative movement between the end faces of the core and the body, and a coil surrounding a length of the core; vibrating the electromechanical device so as to pivot the core about the pivot axis and move the end faces of the core relative to the body; and obtaining an output electrical power from the coil; wherein the magnetic flux in the core passes through the body and provides a restoring force on the pivotable core to urge the end faces of the core into alignment with the body.

The body of high magnetic material may be mounted on a support that is adapted selectively to be movable towards and away from the pivot axis, and the method may further comprise the step of moving the support towards and away from the pivot axis thereby to vary the restoring force.

BRIEF DESCRIPTION OF THE DRAWINGS

An embodiment of the present invention will now be described by way of example only with reference to the accompanying drawings, in which.

DETAILED DESCRIPTION OF THE INVENTION

Figure 2:
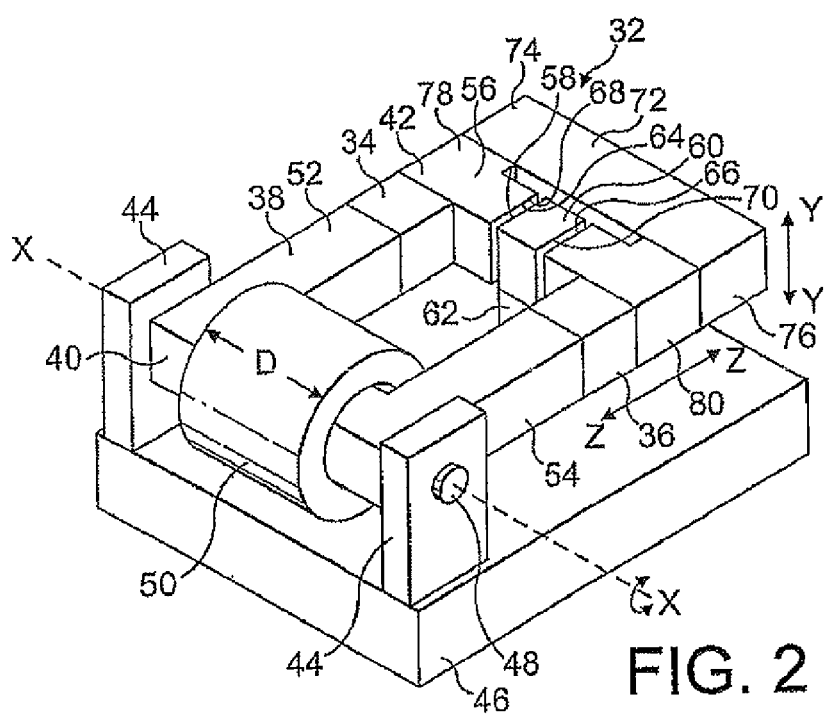
FIG. 2 is a schematic perspective view of an electromechanical generator for converting mechanical vibrational energy into electrical energy in accordance with an embodiment of the present invention.

FIG. 2 shows an electromechanical generator 32 for converting mechanical vibrational energy into electrical energy for use in accordance with an embodiment of the present invention. The electromechanical generator 32 has magnets 34, 36 located in a substantially annular core 38 of a magnetic circuit of high-permeability material. The core 38 is laminated to avoid eddy currents and typically comprises low-loss (low-hysteresis) steel. The core 38 includes two ends 40, 42. At one hinged end 40 the core 38 is pivotally mounted between two upright supports 44 extending upwardly from a base 46, the pivotal mounting being about two opposed rotatable bearings 48. The two bearings 48 define a pivot axis X-X about which the core 38 can rotate, the bearings 48 being mutually spaced along the pivot axis. Typically, the pivot axis X-X is horizontal so that the core can oscillate in a pivoting motion in a vertical direction. A coil 50 surrounds a length of the core 38 between the bearings 48, and is coaxial with the pivot axis X-X. The coil 50 is rotationally fixed, so that it does not rotate as the core 38 pivots. Two opposed sides 52, 54 of the core 38 extends towards the other free end 56 of the core 38. Within each side 52, 54 is disposed a respective magnet 34, 36. Alternatively, only a single magnet is provided, which is located within the core. At the other free end 56 of the core 38 a gap 58 is formed. A stator 60 of high-permeability material is located in the gap 58 and is mounted on a support 62 extending upwardly from the base 46. The two end faces 64, 66 of the core 38 facing the stator 60 have opposite magnetic polarity, as a result of the disposition of the two magnets 34, 36 within the core 38. The support 62 is adapted to be selectively movable in a direction towards or away from the pivot axis X-X, thereby to vary the degree of coincidence between the stator 60 and the end faces 64, 66 of the core 38. There is a narrow spacing 68, 70 between the end faces 64, 66 and the respective opposed faces of the stator 60.

The core 38 containing the magnets 34, 36 creates a region of magnetic flux between the end faces 64, 66 of the core 38, and the stator 60 is located within that region. The presence of the stator 60 within the gap 58 causes the magnetic flux preferentially to flow through the stator 60. This applies a force on the free end 56 of the core 38, vertically aligning the end faces 64, 66 with the stator 60. In the embodiment the force is upwardly directed, against the action of gravity, and the end faces 64, 66 are vertically aligned with the stator 60. In this way, the core 38 is held in a substantially horizontal orientation although hingedly supported at only the hinged end 40.

A high-mass body 72 of low-permeability material is attached to the core 38 at a position remote from the pivot axis X-X. In the embodiment, the high-mass body 72 is an elongate rectangular block with the two ends 74, 76 attached to respective extending parts 78, 80 of the free end 42 of the core 38, the extending parts 78, 80 being oriented so as to extend from the sides 52, 54. The high-mass body 72 and the core 38 are coplanar. The high-mass body 72 is parallel with the free end 42, and so spaced from the gap 58 containing the stator 60 on a side remote from the pivot axis X-X. Alternatively, the high-mass body 72 may be substantially U-shaped with the two ends attached to the free end 42 of the core 38 so as to extend from the sides 52, 54 and with a central portion parallel with the free end 42, and so spaced from the gap 58 containing the stator 60. The low-permeability material is provided so as not to short circuit the magnetic circuit containing the gap 58 and the stator 60. The addition of the high-mass body 72 to the device remote from the pivot axis X-X increases the power output of the electromechanical generator 32, by increasing the inertial mass of the assembly which is rotationally oscillated, but without increasing the high-permeability material which would otherwise tend to increase the possibility of eddy currents, and consequent loss of efficiency.

When the electromechanical generator 32 is subjected to a source of external vibration that causes the core 38 to pivot about the pivot axis X-X in turn causing vertical movement of the free end 42 relative to the stator 60 in the direction Y-Y, this causes differing flows of magnetic flux through the core 38 as a result of the variable relative position of the stator 60 in the air gap 58 between the end faces 64, 66. This causes an electrical current to be induced in the coil 50, which can be use to drive an external device (not shown). A magnetic restoring force causes the core 38 to oscillate together with the applied vibratory motion about the horizontal configuration. Tuning of the restoring force (and hence the resonant frequency of the electromechanical generator 32) can be accomplished by moving the stator 60 in the direction towards and away from the coil 50 in the direction Z-Z.

Figure 1:
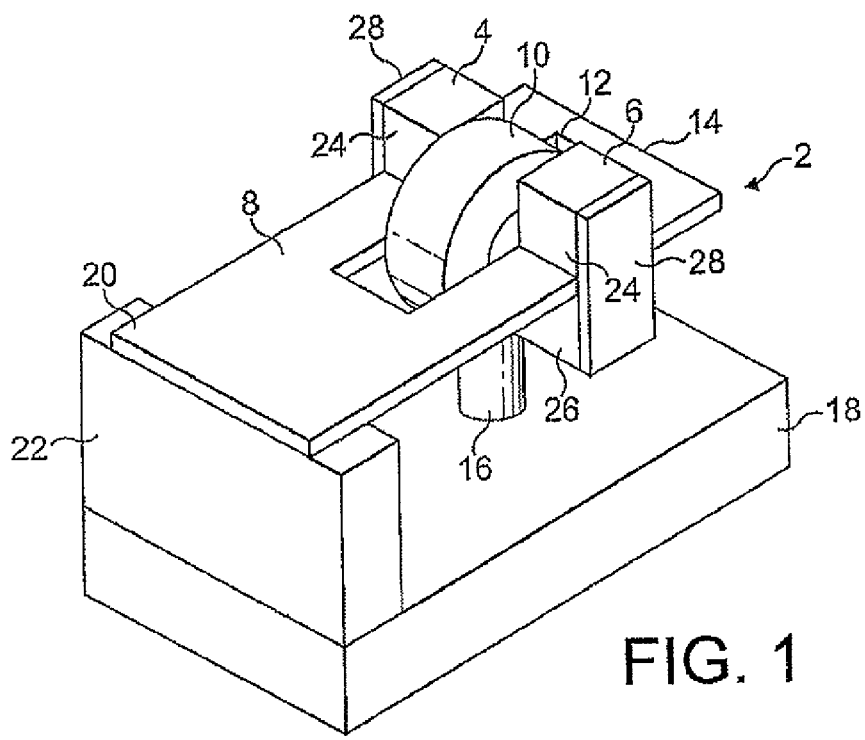
FIG. 1 is a schematic perspective view of a known electromechanical generator for converting mechanical vibrational energy into electrical energy.

As compared to the known device described with reference to FIG. 1, no spring is necessary because of the magnetic restoring force present. This is advantageous because the sprung beam of the known device may tend to have variable spring properties in its useful lifetime, which may cause inadvertent variation in the resonant frequency, degrading the power output and/or requiring difficult adjustment of the device. In the electromechanical generator 32 of the present invention, not only is no spring required, but also the tuning of the resonant frequency can readily be accomplished.

However, in an optional modification of electromechanical generator of the present invention a biasing element, such as a spring, for example, may additionally be provided to apply an additional restoring force to the pivotable core. Such a biasing element could be disposed between the base and the core. The magnetic restoring force would tend to be non-linear with respect to amplitude and accordingly such an additional biasing element may be employed for the purpose to increase the linearity of the restoring force.

Also, due to the much higher flux flow through the core as compared to the flux flow through the coil of the known device described with reference to FIG. 1, the voltage generated at resonance can be much higher. This results from the provision of a smaller air gap, and consequently narrower spacings, between the end faces 64, 66 and the stator 60, as compared to between the magnets of the known device described with reference to FIG. 1.

Furthermore, the coil 50 of the electromechanical generator 32 of the present invention is disposed about the pivot axis X-X and is mounted about a pivoting section of the core 38, although the coil 50 is itself rotationally fixed. Consequently, the coil 50 can have a significant axial length D, which can be as much as the spacing between the core sides 52, 54. The is permits the volume of the core to be larger as compared to the known device described with reference to FIG. 1, which in turn allows the use of thicker, less resistive wire. This reduces the electrical resistance of the coil, which can increase device efficiency.

Various modifications to the electromechanical generator of the present invention will be apparent to those skilled in the art. In the illustrated embodiment the core has a rectangular configuration. However, other shapes may be employed.

The invention claimed is:

1. An electromechanical generator for converting mechanical vibrational energy into electrical energy, the electromechanical generator comprising:

a substantially annular high-permeability core, the core including at least one magnet therein to define a magnetic circuit;

at least one rotatable bearing mounting the core to at least one bearing support, the at least one bearing permitting the core to pivot about a pivot axis when the electromechanical device is vibrated, a gap provided in the core;

a body of high-permeability material located in the gap, the body being independent of, and spaced from, the substantially annular high-permeability core and spaced from respective end faces of the core by a respective spacing whereby pivoting movement of the substantially annular high-permeability core about the pivot axis and relative to the body causes relative movement between the end faces of the core and the body; and a coil surrounding a length of the core, from which coil an output electrical power is obtainable when the electromechanical device is vibrated;

whereby the core containing the at least one magnet creates magnetic flux that flows from one of the end faces to the other of the end faces via the respective spacings and through the body such as to provide a restoring force on the core.

2. An electromechanical generator according to claim 1 wherein the core is mounted to the support by two of the rotatable bearings which are mutually spaced along the pivot axis.

3. An electromechanical generator according to claim 1 wherein the coil is coaxial with the pivot axis.

4. An electromechanical generator according to claim 3 wherein the coil is rotationally fixed.

5. An electromechanical generator according to claim 1 wherein two magnets are provided in the core, one on each side of the coil.

6. An electromechanical generator according to claim 1 wherein the body of high-permeability material is mounted on a support that is adapted selectively to be movable towards and away from the pivot axis such as to vary a degree of coincidence between the body and the end faces of the core and thereby to vary the restoring force.

7. An electromechanical generator according to claim 1 wherein the annular core is substantially rectangular in shape, having a pivoted end on which the coil is mounted, an opposite free end including the gap, and two opposed sides extending therebetween, each side including a respective magnet.

8. An electromechanical generator according to claim 1 wherein a body of low-permeability material is attached to the core at a position remote from the pivot axis.

9. An electromechanical generator according to claim 1 further comprising a base on which the at least one bearing support and the body of high-permeability material are carried.

10. An electromechanical generator according to claim 1, comprising a base from which the at least one bearing support extends, wherein the body is mounted on a support extending from the base.

11. An electromechanical generator according to claim 10, wherein the support upon which the body is mounted is adapted selectively to be moveable towards and away from the pivot axis such as to vary a degree of coincidence between the body and the end faces of the core and thereby to vary the restoring force.

\* \* \* \* \*